(No Model.) 2 Sheets—Sheet 1.
E. WINANS.
POWER TRANSMITTING MACHINERY.
No. 324,509. Patented Aug. 18, 1885.
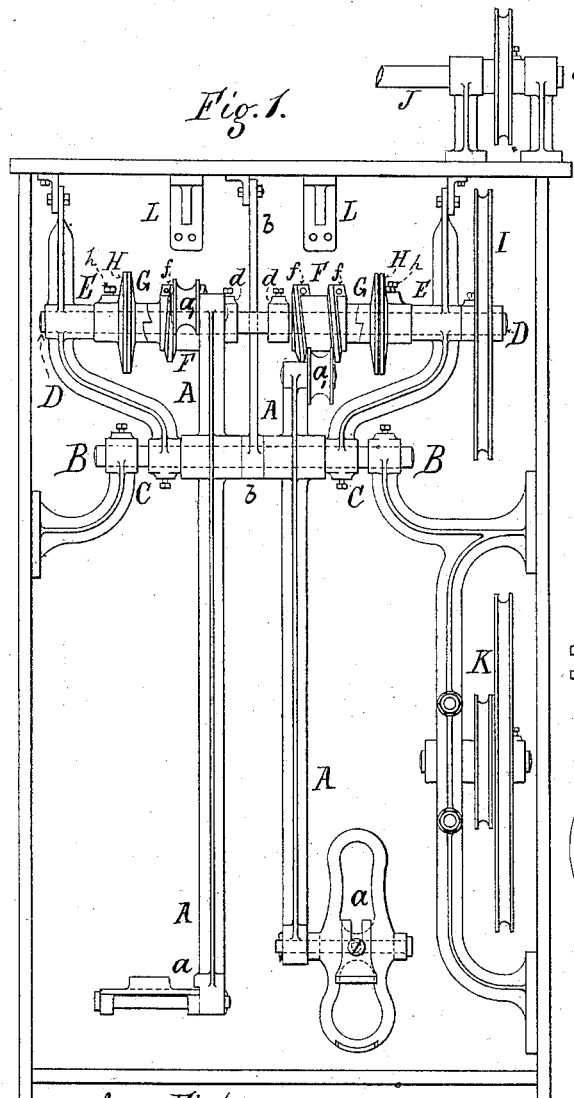
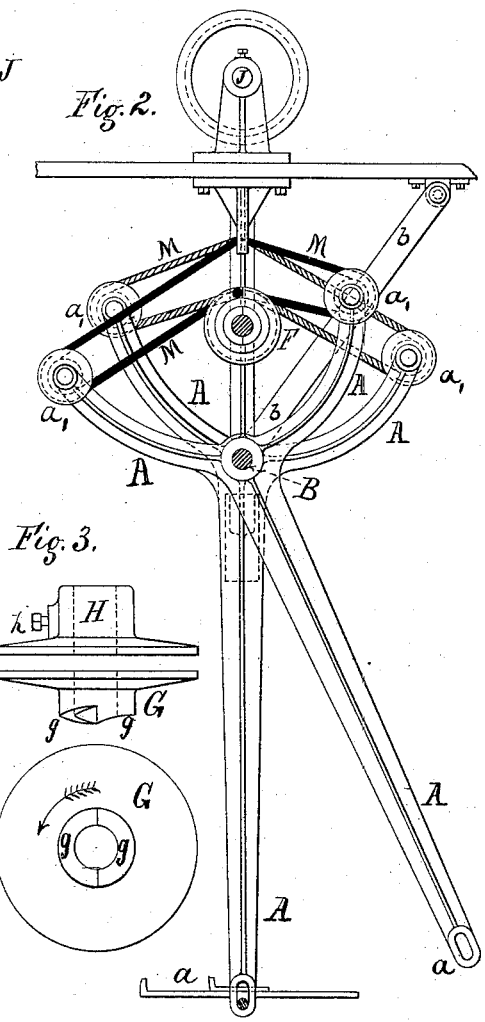
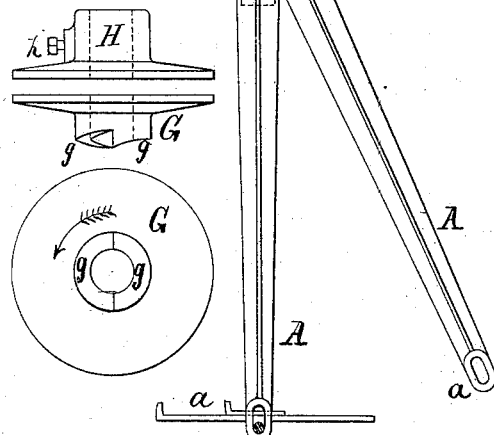
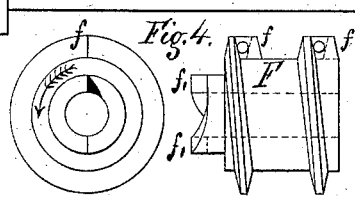
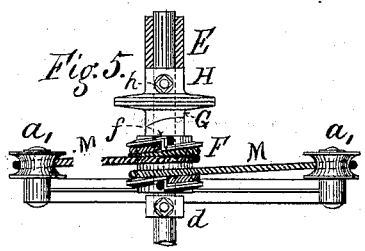
WITNESSES:—
L. P. Smith
A. M. Pierce
INVENTOR:—
Edwin Winans
per
Wm H. W. Eightman
Atty

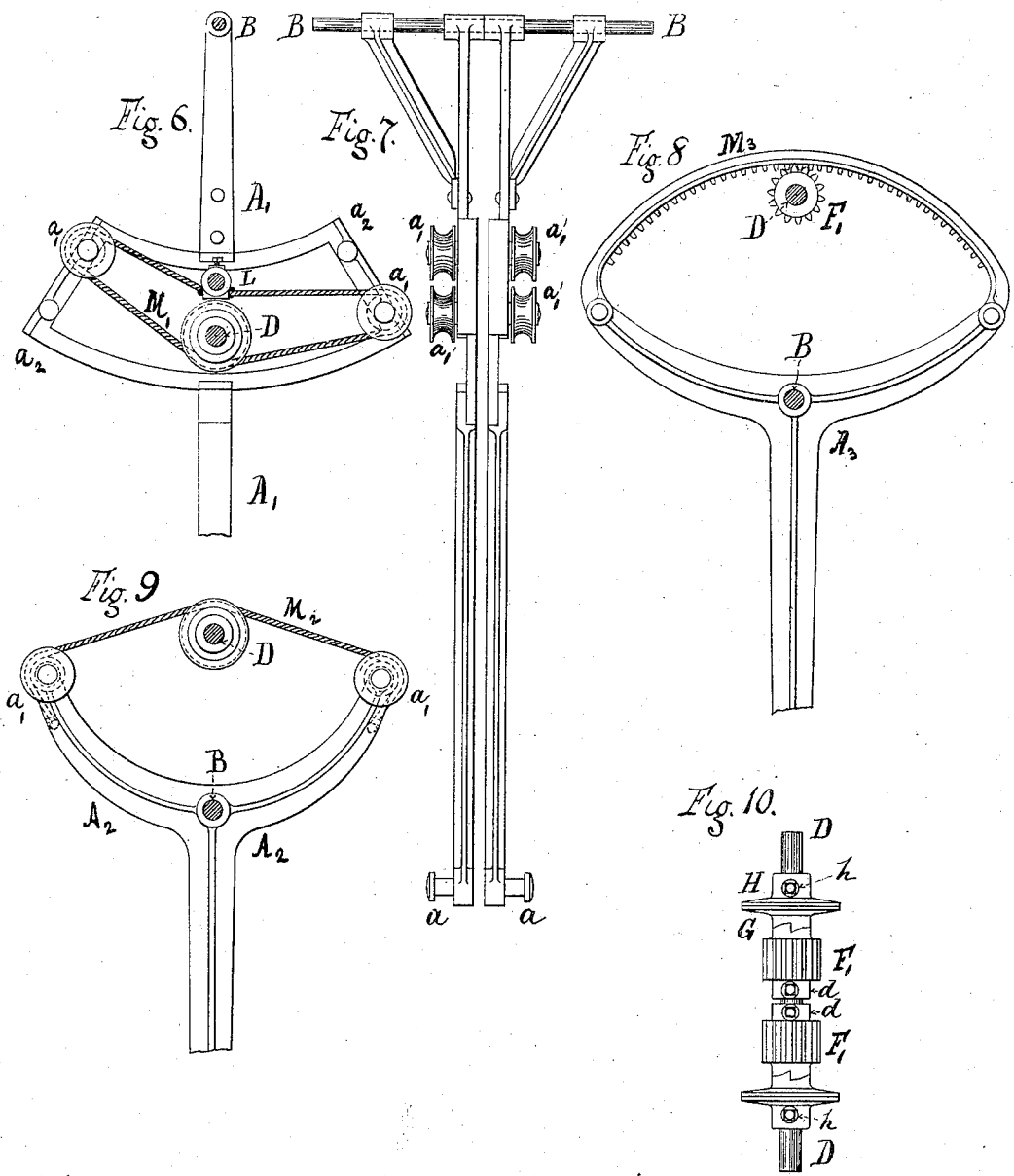

UNITED STATES PATENT OFFICE.

EDWIN WINANS, OF NEW YORK, N. Y.

POWER-TRANSMITTING MACHINERY.

SPECIFICATION forming part of Letters Patent No. 324,509, dated August 18, 1885.

Application filed April 15, 1885. (No model.)

*To all whom it may concern:*

Be it known that I, EDWIN WINANS, a citizen of the United States, residing in the city, county, and State of New York, have invented certain new and useful Improvements in Power-Transmitting Machinery, of which the following is a specification, reference being had to the accompanying drawings.

My invention relates to that class of machinery by and through which moderate powers are developed and transmitted by means of the treadle, lever, or gearing.

The invention may also be applied to the transmission of enlarged powers in proportion to the strength of construction of the several details and parts. It is specially adapted to all movements to which the ordinary treadle motion is applied—the foot-lathe, sewing-machine, bicycle, jig-saw, and all similar machines. It is also adaptable to the higher powers, higher speeds, where even motion is specially requisite, the original motion as applied being an easy and steady one, the method of transmission multiplying the speed, the whole being governed by a fly-wheel.

The original object of my invention was to ease the labor of the operator from the strain now required to keep the sewing-machine up to its work. It is easily apparent that any such improvement may be just as well applied to the operation of any other similar machinery requiring either reciprocating or rotative motion.

Certain of my improvements consist in the combination of a circular or concentric wedge or wedges with the two or more portions of a friction-coupling, whereby pressure is brought to bear upon the faces of a friction-coupling and the coupling caused to act.

Other improvements consist in the combination, with a friction-coupling, of a concentric engaging wedge or wedges operated by a spool mechanism, gear-wheel, or pulley directly connected with or attached to one portion of the engaging wedge or wedges.

Other improvements consist in the combination, with a shaft to which one portion of a friction-coupling is fastened and the intermediate wedge portion, of the coupling through which pressure is brought to bear upon the faces of the friction-coupling and the whole caused to operate.

Other improvements consist in the combination of a friction-coupling engaging circular or concentric wedge attachments and a spool mechanism, gearing, or pulley, through which, by revolution or operation, pressure is brought to bear upon the friction-coupling and the same caused to revolve or operate.

Other improvements consist in the combination of a friction-coupling, circular or concentric wedge or wedges, spool mechanism, gearing or pulley, with a vibrating lever, through which motion is given to the spool mechanism, and thence through friction-coupling to shaft transmitting the power or motion.

Other improvements consist in the combination of two or more sets of the levers, spool mechanism, gearing or pulley, circular or concentric wedge or wedges, friction-coupling, and a shaft operated by the two or more sets of power-transmitting mechanism.

Other improvements consist in the combination of any or all of the several parts hereinafter described and specified in their several connections and duties.

In the accompanying drawings, Figure 1 represents a general plan of a machine embodying my improvements. Fig. 2 represents a sectional view of the same, also showing the method of changing reciprocating motion to revolution or rotative. Fig. 3 represents a detail of friction-coupling embodying a portion of my invention, one portion of which has the prepared concentric wedge projections or clutches through which pressure is effected upon or released from the friction-couplings to make them effective. Fig. 4 represents a detail of spool embodying another portion of my invention and having the concentric wedge or wedges attached thereto to mate with those upon the friction-coupling, as represented in Fig. 3. Fig. 5 is a detailed representation of the method of connection and operation of the several portions of the friction-coupling embodied in this invention. Figs. 6 and 7 represent a modification in the method of construction and operation of the lever and spool mechanism or pulley. Here a link-framing takes the place of the forked lever-arms, as shown in Figs. 1 to 5. The lever in this case centers above the spool-shaft instead of below, as in Figs. 1 and 2. Figs. 8 and 10 represent a further modification in the lever construction, motion being communicated through radial racks and small pinions in lieu of the spool or pulley and belting. The motion of the small pinion may be varied according as the rack portion of the lever is located above or below the pinion. The whole may be suspended from above, as in Fig. 6, instead of below, reversing the curve of the rack. Fig. 9 represents still another modification, operating from above or below, having the belt fastened directly to the two arms of the lever and passing about the power-spool, as in the ordinary fiddle-drill.

Similar letters of reference designate like parts in all the figures.

In the operation of this device as represented or embodied in Figs. 1 to 5, power is applied and motion given to the levers A alternately with the feet upon treadles $a$. Upon the fulcrum or rock-shaft B the lever A is suspended and vibrates as moved by the treadles. The shaft B is supported by the bearings C, and the shaft D, upon which are located and operated the spool mechanism and friction-couplings, is supported by bearings represented at E. The brace $b$ supports the shaft B at its center and transmits the thrust of the levers to the supporting frame-work. At the double ends of the levers are attached sheaves $a'$ $a'$, over which the transmitting belting moves as the arms are vibrated and approach or recede from the spool mechanism F. On the shaft D are supported the operating spools F, one to the right and left of center line of motion. To this spool F is attached one portion of the concentric wedge, mating with the second portion attached to the intermediate disk portion of the friction-coupling G, forming a communicating part between the spool mechanism and the portion H of the friction-coupling fixed upon the shaft D. The motion, as derived from the operation of the levers, is communicated through the spool mechanism, the friction-coupling as formed by H and G with the spool, gear-wheel, or pulley, the shaft D to the belt-pulley I, and thence to the shaft for operating machine; or, again, it is carried through counter-pulleys K and thence to shaft J.

The driving belts are fastened to a fixed bracket, L, carried about the sheaves $a'$ $a'$, to and about the spool F, to the offsets $ff$, where they are fastened. The pulling movement of the belts effects the rotation of the spools through the alternate winding and unwinding of the belt on the spools.

In Figs. 3 and 4 are represented the concentric wedges $ff$, attached to the intermediate disk portion of the friction-coupling, and the mating pieces or wedges $g\ g$, attached to the spool, gear-wheel, or pulley through which power is applied or transmitted. The fixed portion H of the friction-coupling is fastened to the shaft D, and the spool portion of the mechanism is backed by a fixed collar, against which the spool F revolves loosely upon the shaft D.

By means of the lever and belting, or belting alone, motion is given to the spool or pulley F, to move upward upon the concentric wedges of the intermediate section, G, of the friction-coupling, such moving upward tending to separate the spool and intermediate section of the coupling from each other; but the spool being held to place by the fixed collar $d\ d$, and the further portion H of friction-coupling being also held fixed in its place by set-screws $h$, the spreading apart of the movable portions easily jams the two faces of the friction-coupling together and effects the rotation of the shaft D and its communicating pulley I. As soon as the reverse motion of the spool or gear is brought about by the return of the lever the pressure and upward travel of the wedge portion is at once released, and the pressure upon the faces of friction-coupling is withdrawn and transmission stopped. Such alternate action of each individual lever and its accompanying rotating mechanism keeps up a steady rotative pressure upon the shaft D, and thence to pulleys and shafts to be operated.

The direction of pitch of the concentric wedge or wedges governs the motion of the spool to effect the release or transmission of pressure and power. The arrows in Figs. 3 and 4 show the direction for the operation of compression and transmission of power in each, the direction of the rise of the concentric wedges governing the direction of the application of revolution and power, the main feature to be kept directly in view in putting together of the several portions, or the operation of the same, being that the wedge portion of the spool-coupling shall move upward upon the wedge portion of the coupling to effect a solid thrust upon the fixed portion of the coupling to make it operative in the transmission of power. It is not at all necessary to have the flanges on the spool or pulley F follow a thread or screw line, the deviation being made in the representation for the purpose of fastening the belt in a direct line with the action of the belt. The belt of the spool may be fastened to suit operator. A pulley with plain flanges is fully as effective as when following the screw-lines, flanges being merely necessary to retain the belt in place or keep it from slipping off.

In adjusting the device the shaft D is put in position and the fixed portion H of the friction pulley or coupling fixed to wear against the bearings. The balance of the parts G and F are then pressed closely toward the part H, and the collars $d\ d$ fastened to press and keep them in such close position as represented in Fig. 5. The friction-couplings may be either inside or outside, and the spool or pulley and collar in suitable and operative positions.

In Figs. 6 and 7 the rock-shaft or fulcrum of the lever A is located at B, and the shaft D carries the spool and friction-coupling, the same as in Figs. 1 to 5.

In Figs. 8 and 10 a spur-wheel takes the place of the spool and a rack takes the place of the belting.

For light powers, friction bands and wheels may be made to act equally well with the gearing or spools.

B represents a rock-shaft or fulcrum, and supports the lever A² in its reciprocating or vibrating movements. Here the revolving of the spur-wheels brings the wedge or wedges into full operation and the coupling into contact by moving the wedge or wedges of the gear-wheel upward upon the wedge or wedges of the intermediate portion of the coupling combination, forcing the faces of the friction-coupling into perfect contact and effecting the revolution of the shaft to which it is attached, pressing and releasing the coupling after similar manner as that effected by the spool.

Fig. 9 represents a modification in which the belt is attached directly to the arms of the lever and operated about the spool or pulley after the manner of a fiddle-drill.

It is not essential that the portions of the friction-coupling shall be of the disk form, any form consistent with friction and suitable to the work to be performed and the space occupied being equally applicable to this method of operation, the only condition being that there shall be surface sufficient to warrant the constant and reliable action of the coupling when called upon.

What I claim as new, and desire to secure by Letters Patent, is—

1. The combination of the circular or concentric wedges $f$ and $g$ with two or more portions of a friction-coupling, whereby pressure is brought to bear upon the faces of the coupling and cause the same to act, substantially as set forth.

2. The combination of a shaft, the fixed portion of the friction-coupling attached thereto, a movable half of a friction-coupling having circular or concentric wedge or wedges attached thereto, and movable spool, gear-wheel, or pulley having circular or concentric wedge or wedges attached thereto and mating those of the movable half of the friction-coupling, whereby pressure is brought to bear upon the concentric or circular wedges, and thence upon the friction-coupling, and by the reverse movement or action the friction-coupling released, substantially as set forth.

3. The combination, in a friction-coupling, of a fixed portion or face, a loose portion or face having engaging wedge or wedges concentric with operation of coupling, a spool, gear-wheel, or pulley having concentric wedge or wedges mating those of loose portion of coupling, whereby pressure is brought to bear upon and operate the friction-coupling and connected shafting, substantially as set forth.

4. The combination, with a friction-coupling, substantially as set forth, of a vibrating lever, a treadle, and shaft upon which the lever is operated, and a belt whereby motion is transmitted from the vibrating lever to spool or pulley and friction-faces of coupling, substantially as set forth.

5. The combination of a treadle, substantially as shown, a lever or vibrating arm, a rock-shaft upon which the vibrating arm or lever is suspended and rocks, a belt operating in connection with the lever, and a spool mechanism or pulley, whereby the spool is caused to revolve in either direction, and through the concentric wedges operating the friction-coupling cause the friction-coupling to revolve or release the operating-shaft, substantially as set forth.

6. In combination with a treadle, vibrating arm or lever, a rock-shaft upon which the vibrating lever or arm is caused to operate or rock, a double-arm connection of said lever, upon which sheaves for belting are fixed, a belt communicating with and operating a spool or pulley, and a collar upon which the thrust of the spool or pulley is taken in its movement upon the concentric wedge or wedges of the coupling, substantially as and for the purposes specified.

7. In combination with a treadle, vibrating arm or lever, a rock-shaft upon which the vibrating lever or arm is caused to operate or rock, a double-arm connection of said lever, upon which a rack is fixed or attached, a pinion operated by the attached rack, and a collar, upon which the thrust of the spool or pulley is taken in its movement upon the concentric wedge or wedges of the coupling, substantially as and for purposes specified.

8. In combination with a shaft upon which they operate, the fixed portion of coupling H, the loose portion of coupling G, having its concentric wedge or wedge projections, the spool or pulley F, to which are attached concentric wedge projections mating with and operating upon those of the intermediate loose portion, G, the collar $d$, fixed upon the shaft to take the thrust of spool or pulley against the wedges of the friction-coupling, and a belt intermittently operated to and fro, substantially as set forth.

9. The combination of the shaft D and pulley I, the portions H and G of a friction-coupling, the spool or pulley F, the collar $d$, the operating-belt M, the sheaves $a'$, the forked lever A or A³, and the rock-shaft or fulcrum B, substantially as set forth.

10. The combination of two or more sets of the following details of mechanism: the fixed portion of friction-coupling H, the loose portion G, having one or more concentric wedges, $g\ g$, thereto attached, the flanged spool or pulley F, having one or more concentric wedges, $f\ f$, thereto attached and mating those of loose portion G, the fixed collar $d$, the shaft D, the belt M, and the lever or arm A, A', or A², whereby a steady revolution is effected of the shaft D and its communicating pulley I through the alternate operation of the several levers or arms in the combination, substantially as set forth.

11. In combination with a friction coupling, substantially as described, the lever A', provided with an operating-link, upon which the sheaves a' a' are carried, and the belt M', substantially as set forth.

12. In combination with a friction-coupling, substantially as set forth, the lever A², having the belt M², running directly from and attached to both arms of the lever, and over and about the spool or pulley F, substantially as set forth.

13. In combination with a shaft upon which they operate, the fixed portion of friction-coupling H, the loose portion G, having one or more concentric wedges mating with those of the gear-wheel or pinion F', and the radial rack M³, operated to and fro, substantially as set forth.

14. The combination of two or more sets of the following details or elements of mechanism: the fixed portion of friction-coupling H, the loose portion G, having one or more concentric wedges, $g\ g$, thereto attached, the pinion F', having one or more concentric wedges, $f\ f$, thereto attached and mating those of loose portion G, the fixed collar $d$, the shaft D, the radial rack M³, and the lever-arm A³, whereby a steady and continuous revolution is effected of the shaft D through the alternate operation of the several levers or arms in combination, substantially as set forth.

EDWIN WINANS.

In presence of—
  R. GUGGENHEIMER,
  WM. H. WEIGHTMAN.